(12) United States Patent
Lu et al.

(10) Patent No.: US 11,974,228 B2
(45) Date of Patent: Apr. 30, 2024

(54) WIDE-BANDWIDTH TRANSMISSION IN WIRELESS COMMUNICATIONS

(71) Applicant: MediaTek Singapore Pte. Ltd., Singapore (SG)

(72) Inventors: Kai Ying Lu, San Jose, CA (US); Hung-Tao Hsieh, Hsinchu (TW); Yen-Shuo Lu, Hsinchu (TW); Chao-Chun Wang, San Jose, CA (US); James Chih-Shi Yee, San Jose, CA (US); Yongho Seok, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/344,340

(22) Filed: Jun. 10, 2021

(65) Prior Publication Data
US 2021/0392587 A1 Dec. 16, 2021

Related U.S. Application Data

(60) Provisional application No. 63/038,940, filed on Jun. 15, 2020.

(51) Int. Cl.
*H04W 52/14* (2009.01)
*H04W 74/00* (2009.01)
*H04W 74/0816* (2024.01)
*H04W 92/20* (2009.01)

(52) U.S. Cl.
CPC ......... *H04W 52/14* (2013.01); *H04W 74/008* (2013.01); *H04W 74/0816* (2013.01); *H04W 92/20* (2013.01)

(58) Field of Classification Search
CPC . H04W 74/0816; H04W 52/34; H04W 52/30; H04W 52/04
See application file for complete search history.

(56) References Cited

U.S. PATENT DOCUMENTS

| | | |
|---|---|---|
| 10,484,944 B2 | 11/2019 | Li et al. |
| 2015/0319700 A1 | 11/2015 | Oteri et al. |
| 2017/0208625 A1* | 7/2017 | Choi .................. H04W 74/006 |
| 2018/0199380 A1* | 7/2018 | Itagaki ............. H04W 74/0816 |
| 2020/0053829 A1 | 2/2020 | Morioka |

OTHER PUBLICATIONS

European Patent Office, European Extended Search Report for European Patent Application No. 21179019.1, dated Nov. 9, 2021.

* cited by examiner

*Primary Examiner* — James P Duffy
(74) *Attorney, Agent, or Firm* — Han IP PLLC; Andy M. Han (57) ABSTRACT

An apparatus (e.g., an access point (AP) or a non-AP station (STA)) detects a non-primary subband of an operating bandwidth comprising a primary subband and the non-primary subband to be idle. The apparatus controls a transmit power in performing transmission on at least the non-primary subband.

13 Claims, 6 Drawing Sheets

WIDE-BANDWIDTH TRANSMISSION IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/038,940, filed 15 Jun. 2020, respectively, the content of which being incorporated by reference in its entirety.

TECHNICAL FIELD

The present disclosure is generally related to wireless communications and, more particularly, to wide-bandwidth transmission in wireless communications.

BACKGROUND

Unless otherwise indicated herein, approaches described in this section are not prior art to the claims listed below and are not admitted as prior art by inclusion in this section.

In next-generation wireless communications such as those in wireless local area networks (WLANs) based on an Institute Electrical and Electronics Engineers (IEEE) standard including IEEE 802.11be, wide-bandwidth operations in wider bandwidths, including 320 MHz, 160+160 MHz, 240 MHz, 160+80 MHz, 160 MHz and 80+80 MHz, are supported. However, the transmit power may be limited by the minimum allowed power level and the transmission bandwidth may be limited due to interference and fairness issues. Moreover, in wide-bandwidth operations, different subbands may be under different regulatory domains. When multiple basic service sets (BSSs) coexist and have different operating bandwidths (e.g., 20/40/80 MHz/160/240/320 MHz bandwidth), channel interference may be different in different channels and subbands. When different channel access rules apply on different subbands, fairness among overlapping basic service sets (OBSSs) becomes an issue. Therefore, there is a need for a solution to address aforementioned issues for wide-bandwidth operations.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to wide-bandwidth transmission in wireless communications. Under various proposed schemes in accordance with the present disclosure, it is believed that aforementioned issues may be addressed or otherwise alleviated.

In one aspect, a method may involve detecting a non-primary subband of an operating bandwidth comprising a primary subband and the non-primary subband to be idle. The method may also involve performing a transmission on at least the non-primary subband.

In another aspect, an apparatus may include a transceiver and a processor coupled to the transceiver. The transceiver may be configured to communicate wirelessly over an operating bandwidth comprising a primary subband and a non-primary subband. The processor may be configured to detect, via the transceiver, the non-primary subband to be idle. The processor may also be configured to perform a transmission, via the transceiver, on at least the non-primary subband.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to wide-bandwidth transmission in wireless communications. According to the present disclosure, a number of possible solutions may be implemented separately or jointly. That is, although these possible solutions may be described below separately, two or more of these possible solutions may be implemented in one combination or another.

Figure 1:
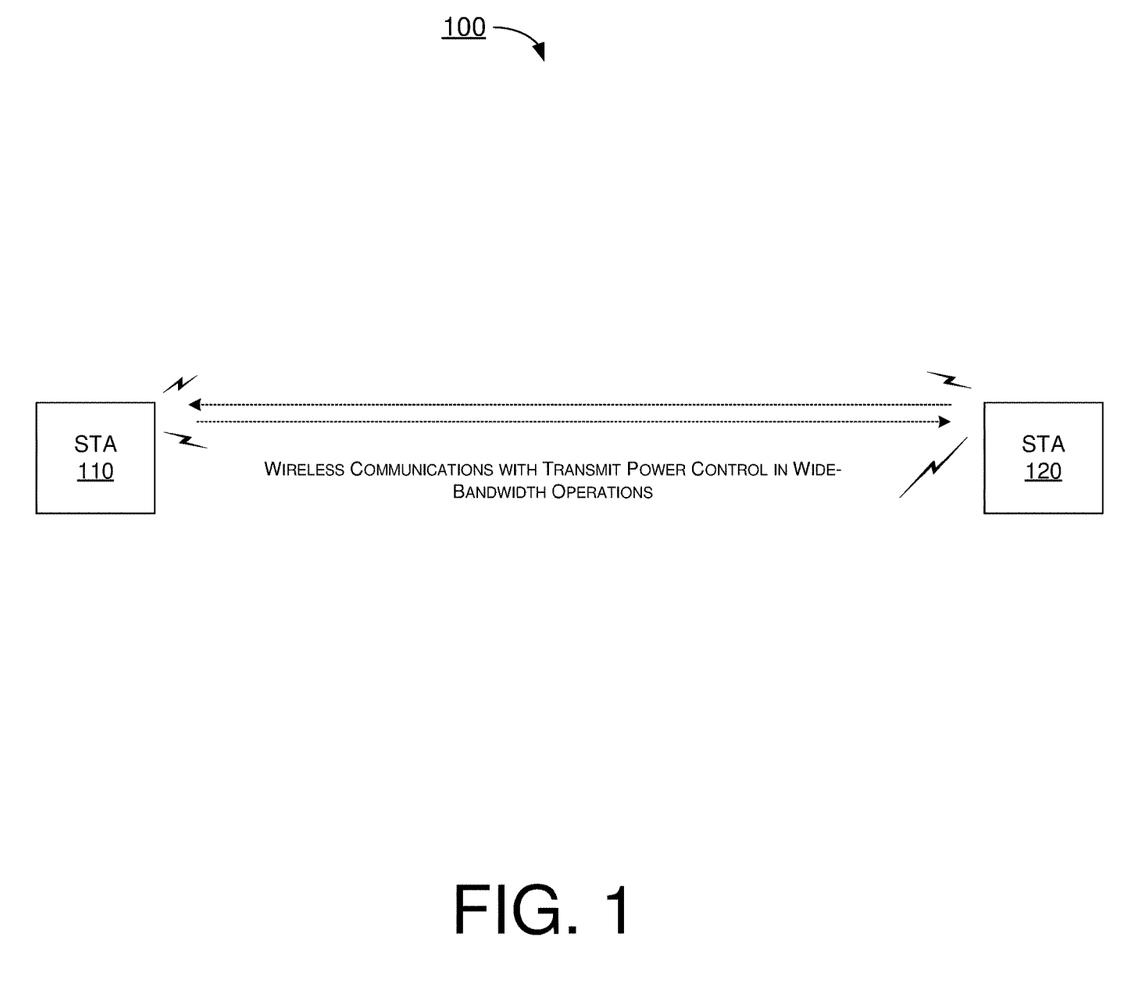
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a STA 110 and a STA 120 may be communicating wirelessly with each other in accordance with one or more IEEE 802.11 standards (e.g., IEEE 802.11be and beyond). Each of STA 110 (herein interchangeably denoted as "STA1") and STA 120 (herein interchangeably denoted as "STA2") may function as an access point (AP) station (STA) or a non-AP STA. Moreover, each of STA 110 and STA 120 may perform wide-bandwidth operations. Under various proposed schemes in accordance with the present disclosure, STA 110 and STA 120 may be configured to perform wide-bandwidth transmission in wireless communications (e.g., in a 320 MHz, 160+160 MHz, 240 MHz, 160+80 MHz, 160 MHz or 80+80 MHz operating bandwidth) in accordance with various proposed schemes described below. It is noteworthy that, in the present disclosure, the term "primary channel" refers to a 20 MHz channel where medium access through channel contention is allowed. The term "non-primary channel" refers to a 20 MHz channel which is not a primary channel in an operating channel. The term "subband" refers to a sub-group of 20 MHz channels within a wide operating bandwidth and may have a total bandwidth of 20 MHz, 40 MHz, 80 MHz, 160 MHz, 80+80 MHz, 240 MHz, 160+80 MHz, and 320 MHz. The term "non-primary subband" refers to a sub-group of 20 MHz channels not including the primary channel.

In a wide-bandwidth operation system with multiple narrow subbands and channels, transmit power or power spectrum density requirement over the wide bandwidth may vary. Additionally, channel interference conditions over the wide bandwidth may change differently. Moreover, channel access rules over the wide bandwidth may also be different. In view of the above, it is believed that under various proposed schemes herein, the control of transmit power may be designed to allow a device (e.g., STA 110 and/or STA 120) to transmit frames using controlled power on different part of the wide bandwidth so that spectrum efficiency may be improved.

Under a proposed scheme in accordance with the present disclosure with respect to transmit power control over subbands in a wide operating bandwidth, the transmit power over the subbands may be controlled jointly and/or independently. For instance, the transmit power over different subbands may be independent and different based on a potential allowed transmit power over a specific subband. Additionally, the transmit power over different subbands may be the same and jointly determined based on the minimum of the potential allowed transmit power over each subband. Moreover, the potential allowed transmit power may be subject to at least one of the following: regulatory requirement, interference mitigation requirement, and fairness requirement with respect to other coexisting system(s) and/or overlapping BSS(s).

Under a proposed scheme in accordance with the present disclosure with respect to subband transmit power adjustment, a potential transmit power over a non-primary channel and/or subband may be adjusted by delta dB from a reference transmit power based on a physical channel sensing on the potential transmission channel/subband with one or more of a number of options described below. In a first option (option 1), when performing enhanced distributed channel access (EDCA) backoff on a non-primary channel based on physical channel sensing with preamble detection (PD) threshold plus energy detection (ED) threshold, the PD and ED thresholds may be static. For instance, the PD threshold may be set to value 1 (e.g., −82 dBm on a 20 MHz channel) and the ED threshold may be set to value 2 (e.g., −72 dBm or −82 dBm on a 20 MHz channel). In case the non-primary 20 MHz channel is determined to be idle using ED threshold (e.g., −72 dBm), the potential transmit power on the non-primary channel/subband may be adjusted by a default delta dB (e.g., 10 dB) or a value determined by the device (e.g., STA 110 or STA 120) based on measurements within a predefined period of time. In case the non-primary 20 MHz channel is determined to be idle using a low ED threshold (e.g., −82 dBm), then the delta dB may be zero and the potential transmit power on the non-primary channel/subband may be used as the reference transmit power.

In a second option (option 2), when performing EDCA backoff on a non-primary channel based on physical channel sensing with PD threshold, the PD threshold may be dynamic within a range between a minimum threshold (ThresholdMin) and a maximum threshold (ThresholdMax) such as between −82 dBm and −62 dBm on a 20 MHz channel. When the PD threshold is ThresholdMin, the potential transmit power may correspond to the reference transmit power. When the PD threshold is ThresholdMax, the potential transmit power may be reduced by an amount (=ThresholdMax−ThresholdMin dB) from the reference transmit power. When the PD threshold is between ThresholdMax and ThresholdMin, the potential transmit power may be reduced by an amount (=threshold−ThresholdMin dB) from the reference transmit power.

In a third option (option 3), when performing point coordination function (PCF) inter-frame space (P IFS) energy detection (ED) check during a PIFS interval before a start of transmission on a non-primary 20 MHz channel in the non-primary subband, the ED threshold may be static (e.g., −72 dBm or −82 dBm on a 20 MHz channel). In case the non-primary 20 MHz channel is determined to be idle using ED threshold (e.g., −72 dBm), the potential transmit power on the non-primary channel/subband may be adjusted by a default dB (e.g., 10 dB) or a value determined by the device (e.g., STA 110 or STA 120) based on measurements within a predefined period of time. In case the non-primary 20 MHz channel is determined to be idle using a lower ED threshold (e.g., −82 dBm), then the delta dB may be zero and the potential transmit power on the non-primary channel/subband may be used as the reference transmit power.

In a fourth option (option 4), when performing PIFS ED check during a PIFS interval before a start of transmission on a non-primary channel, the ED threshold may be dynamic within a range between ThresholdMin and ThresholdMax (e.g., between −82 dBm and −62 dBm on a 20 MHz channel) in conjunction with the adjustment of the potential transmit power. For instance, when ED threshold is ThresholdMin, the potential transmit power may correspond to the reference transmit power. When ED threshold is ThresholdMax, the potential transmit power may be reduced by an amount (=ThresholdMax−ThresholdMin dB) from the reference transmit power. When ED threshold is between ThresholdMax and ThresholdMin, the potential transmit power may be reduced by an amount (=threshold−ThresholdMin dB) from the reference transmit power.

Under a proposed scheme in accordance with the present disclosure, various subband transmit power control approaches may be undertaken when a non-primary subband is idle. Under the proposed scheme, in a first case when the primary 20 MHz channel is idle with a static PD threshold of −82 dBm, either a static ED threshold or a dynamic ED threshold may be utilized when performing PIFS ED check during a PIFS interval before a start of transmission on the non-primary subband. Under the proposed scheme, transmission on both the primary and non-primary subbands may be performed with a potential transmit power adjustment on the non-primary subband. For instance, the primary 20 MHz may be determined to be idle based on detection of network allocation vector (NAV) idle and detection of clear channel access (CCA)-PD idle. In case the non-primary subband is determined to be idle (e.g., based on PIFS ED check idle with a static or dynamic ED threshold), transmission on the idle non-primary subband may be allowed. Moreover, transmit power on the non-primary subband may be adjusted by a delta dB based on power control options described above. On the other hand, in case the non-primary subband is determined to be busy (e.g., based on PIFS ED check busy when a detected ED level is greater than the ED threshold), no transmission may be allowed on the busy non-primary subband.

Under the proposed scheme, in a second case when the primary 20 MHz channel is idle with a dynamic PD threshold (e.g., −62 dBm≥PD threshold≥−82 dBm), either a static ED threshold or a dynamic ED threshold may be utilized when performing PIFS ED check on the non-primary subband. Under the proposed scheme, transmission on both the primary and non-primary subbands may be performed with a potential transmit power adjustment on both the primary and non-primary subbands jointly or independently. For instance, the primary 20 MHz may be determined to be idle with a dynamic PD threshold (e.g., based on detection of NAV idle and PD level≤−62 dBm). In case the non-primary subband is determined to be idle (e.g., based on PIFS ED check idle with a static or dynamic ED threshold), transmission on the idle non-primary subband may be allowed. Moreover, transmit power on the non-primary subband may be adjusted by a delta dB based on power control options described above. On the other hand, in case the non-primary subband is determined to be busy (e.g., based on PIFS ED check busy when a detected ED level is greater than the ED threshold), no transmission may be allowed on the busy non-primary subband.

Under the proposed scheme, in a third case when the primary 20 MHz channel is busy (non-idle) with either a static PD threshold or a dynamic PD threshold (e.g., ≥−62 dBm), EDCA backoff on the non-primary subband may be performed utilizing either a static or a dynamic PD or ED threshold. Under the proposed scheme, transmission may be performed only on the non-primary subband with a potential transmit power adjustment on the non-primary subband. That is, transmission will not be on the primary subband but will only on the non-primary subband. For instance, the primary 20 MHz may be determined to be busy when the detected PD level is greater than or equal to −62 dBm if using dynamic PD threshold. In case the non-primary subband is determined to be idle, and in case EDCA backoff is performed on one non-primary 20 MHz channel of the non-primary subband using a static or dynamic PD or ED threshold, then transmission on the non-primary subband may be allowed when a backoff timer for the EDCA backoff counts down to zero. Moreover, transmit power on the non-primary subband may be adjusted by a delta dB based on power control options described above. On the other hand, in case the non-primary subband is determined to be busy (e.g., EDCA backoff being suspended), no transmission may be allowed on the busy non-primary subband.

Under a proposed scheme in accordance with the present disclosure with respect to signal energy measurements, energy detection for OBSS signal or other system signals on non-primary channels may be performed whenever an AP (e.g., STA 110 or STA 120) is in the state or process of receiving. The detected signal energy level on each non-primary channel, which is higher than a specific PD or ED threshold, e.g., PD level≥−82 dBm, ED level≥−72 dBm (in a 2.4 GHz, 5 GHz or 6 GHz band) or −62 dBm (in the 6 GHz band), may be recorded within a window (e.g., sliding window) of time. A size of the window may be one or more Beacon intervals. Under the proposed scheme, there may be several options for determining the signal energy level per sliding window. In a first option (option 1), the maximum signal energy level detected within a given sliding window of time may be used as the signal energy level for that sliding window. In a second option (option 2), the mathematic average signal energy level detected within a given sliding window of time may be used as the signal energy level for that sliding window. In a third option (option 3), the proportional fair average signal energy level detected within a given sliding window of time may be used as the signal energy level for that sliding window, which may be mathematically expressed as follows:

$$ED_{avg\text{-}new} = \alpha * ED_{avg\text{-}cur} + (1-\alpha) * ED.$$

Here, $ED_{avg\text{-}new}$ denotes the new average ED level, $ED_{avg\text{-}cur}$ denotes the current average ED level, ED denotes the current measurement value, and α denotes a proportional fairness coefficient.

Figure 2:
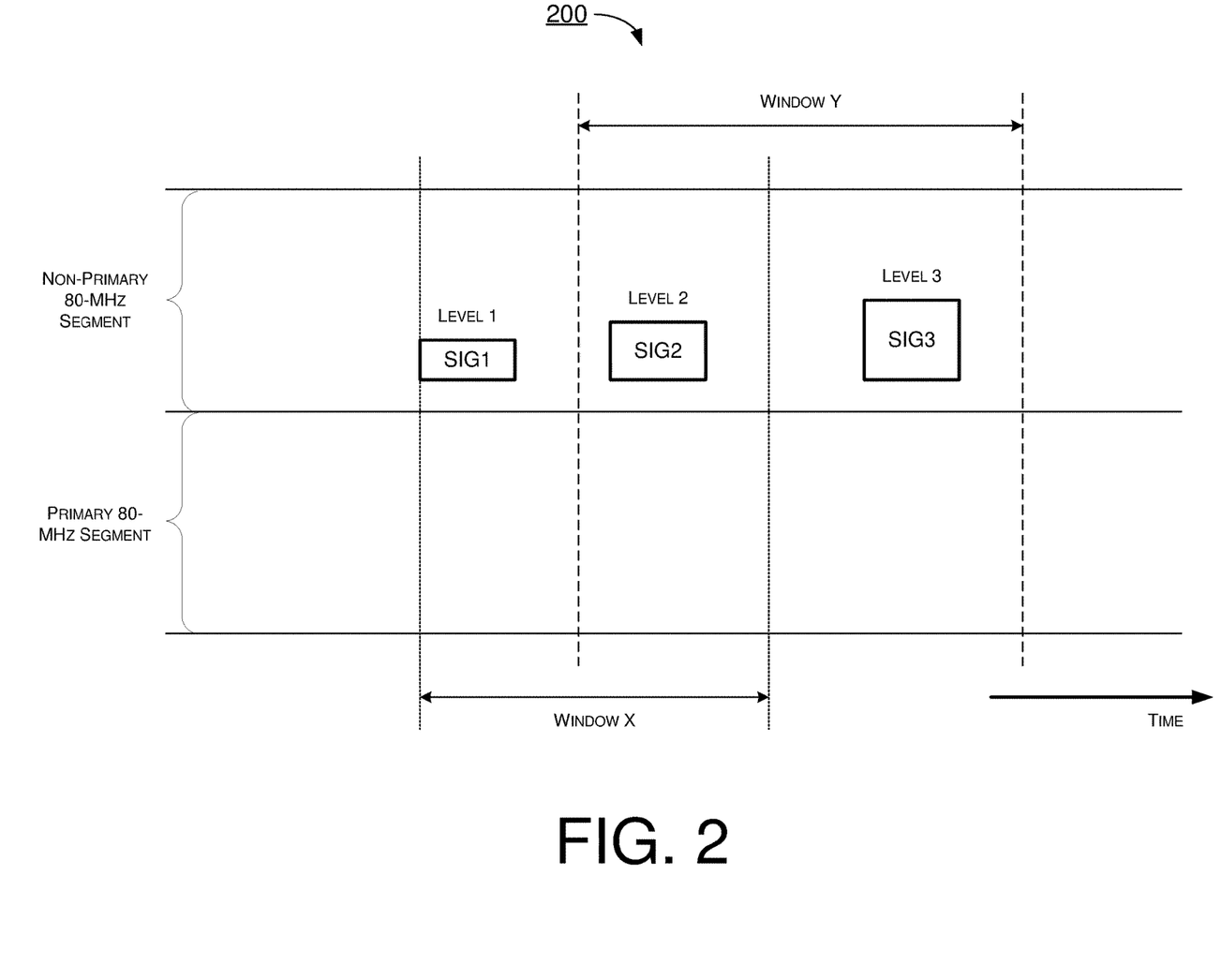
FIG. 2 is a diagram of an example scenario in accordance with the present disclosure.

FIG. 2 illustrates an example scenario 200 under an implementation in accordance with the present disclosure. For illustrative purposes and without limiting the scope of the present disclosure, scenario 200 shows an example in which a 160 MHz bandwidth is separated into two 80 MHz frequency segments. In window X, there are two signals detected, namely a first signal (SIG1) with a first signal strength level (level 1) and a second signal (SIG2) with a second signal strength level (level 2). Sliding from window X to window Y, there are two signals detected, namely SIG2 with a second signal strength level (level 2) and a third signal (SIG3) with a third signal strength level (level 3). All measurement results within a specific window may be recorded and the signal energy level per sliding window may be determined based on one of the options described above.

Figure 3:
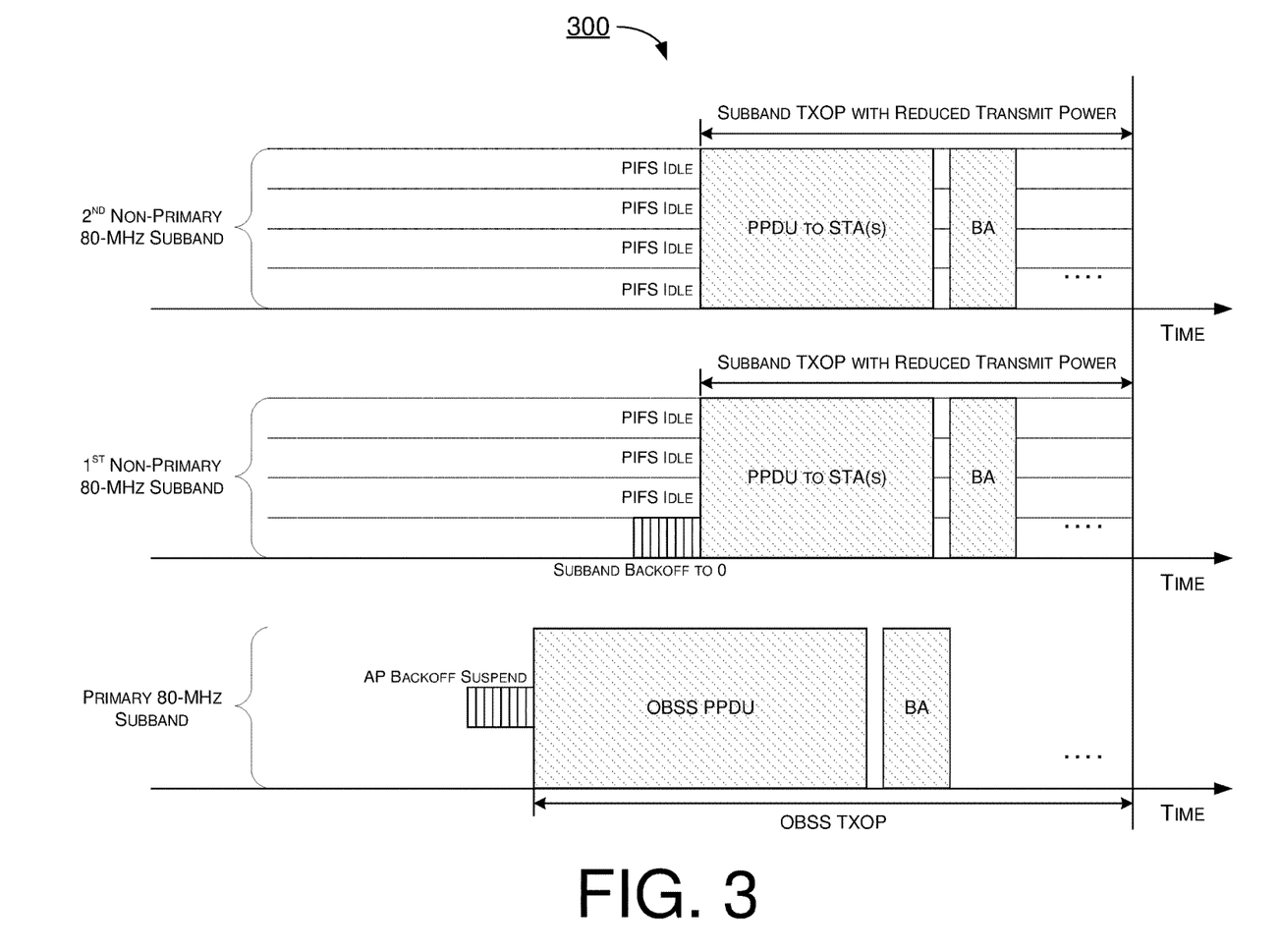
FIG. 3 is a diagram of an example scenario in accordance with the present disclosure.

FIG. 3 illustrates an example scenario 300 under an implementation in accordance with the present disclosure. For illustrative purposes and without limiting the scope of the present disclosure, scenario 300 shows an example of subband transmission under a proposed scheme. In scenario 300, transmission on a non-primary subband may be allowed with transmit power control over the subbands under a number of conditions listed below. A first condition may be that an AP detects an OBSS physical-layer protocol data unit (PPDU) with a strong signal strength (e.g., PD level of the detected signal >−62 dBm), and the AP decides to take a chance on the non-primary subband(s) to use unoccupied subband(s) for transmission. A second condition may be that the AP performs EDCA backoff on a non-primary 20 MHz channel in a non-primary 80 MHz subband using PD+ED thresholds (e.g., PD threshold=−82 dBm and ED threshold=−72 dBm). When a backoff timer for the EDCA backoff counts down to zero, the AP can transmit on the non-primary 80 MHz subband. A third condition may be that the transmit power on the non-primary 80 MHz subband is to be adjusted by delta dB from a reference transmit power. The delta dB may be a default value (e.g., 10 dB). A fourth condition may be that, in case the ED threshold is set to a lower value (e.g., −82 dBm), then the transmit power on the non-primary 80 MHz subband may be equal to the reference transmit power without reduction. Referring to FIG. 3, transmission may be performed with a reduced transmit power after subband backoff to zero on a non-primary 20 MHz channel of the non-primary 80 MHz subband, as shown in the example of $1^{st}$ non-primary 80-MHz subband. Alternatively, transmission may be performed with a reduced transmit power, that is reduced by a default delta dB when using a regular ED threshold (e.g., −72 dBm), after PIFS idle detection without backoff, as show in the example of $2^{nd}$ non-primary 80-MHz subband.

Figure 4:
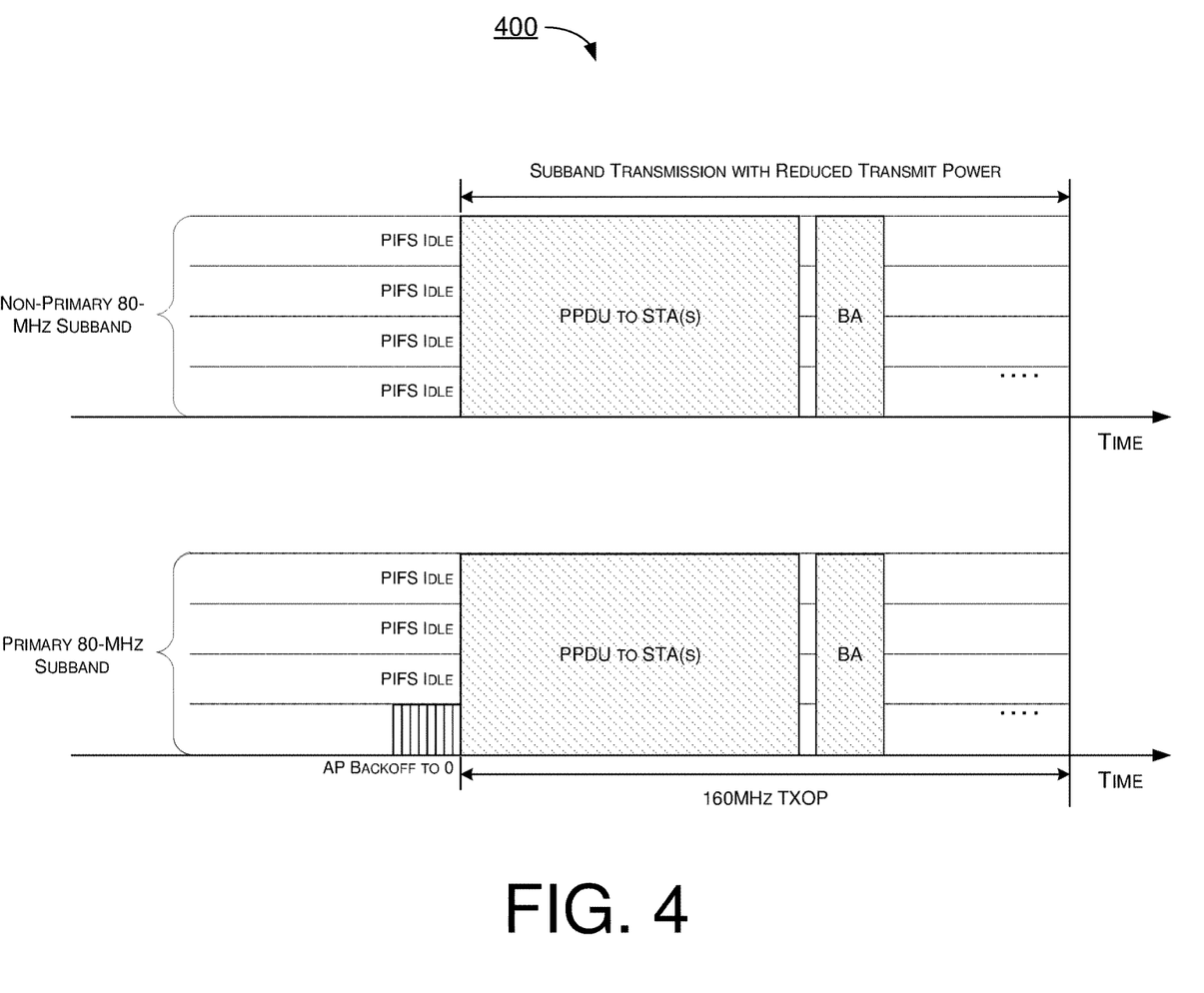
FIG. 4 is a diagram of an example scenario in accordance with the present disclosure.

FIG. 4 illustrates an example scenario 400 under an implementation in accordance with the present disclosure. For illustrative purposes and without limiting the scope of the present disclosure, scenario 400 shows an example of subband transmission under a proposed scheme. In scenario 400, transmission on a non-primary subband may be allowed with transmit power control over the subbands under a number of conditions listed below. A first condition may be that, when an AP obtains a transmission opportunity (TXOP) through: (1) EDCA backoff on a primary 20 MHz channel and (2) PIFS ED idle check on non-primary channels, the AP may transmit on the non-primary subband with reduced transmit power. A second condition may be that the PIFS ED threshold may be static or dynamic. A third condition may be that the transmit power on the non-primary 80 MHz subband is to be adjusted by a default delta dB (e.g., 10 dB) from a reference transmit power assuming a higher ED threshold is used. For instance, the AP may have per-bandwidth of 20 MHz channel (BW20) energy detection. In a bandwidth of 160 MHz (e.g., non-contiguous 80 MHz+80 MHz) for example, there may be 8 per BW20 EDs and also secondary 20/40/80 ED. Also, the transmission may be performed on the non-primary channels which are idle as determined by the energy detection. A fourth condition may be that, in case the ED threshold is set to a lower value (e.g., −82 dBm), the transmit power on the non-primary channels may be set to be the reference transmit power. A fifth condition may be that, in case the ED threshold is within a range (e.g., between −82 dBm and −62 dBm), the transmit power on the non-primary channels may be adjusted by a delta dB in conjunction with the corresponding ED level. Referring to FIG. 4, transmission may be performed with a reduced transmit power on a subband after detection of PIFS ED idle on the subband.

Illustrative Implementations

Figure 5:
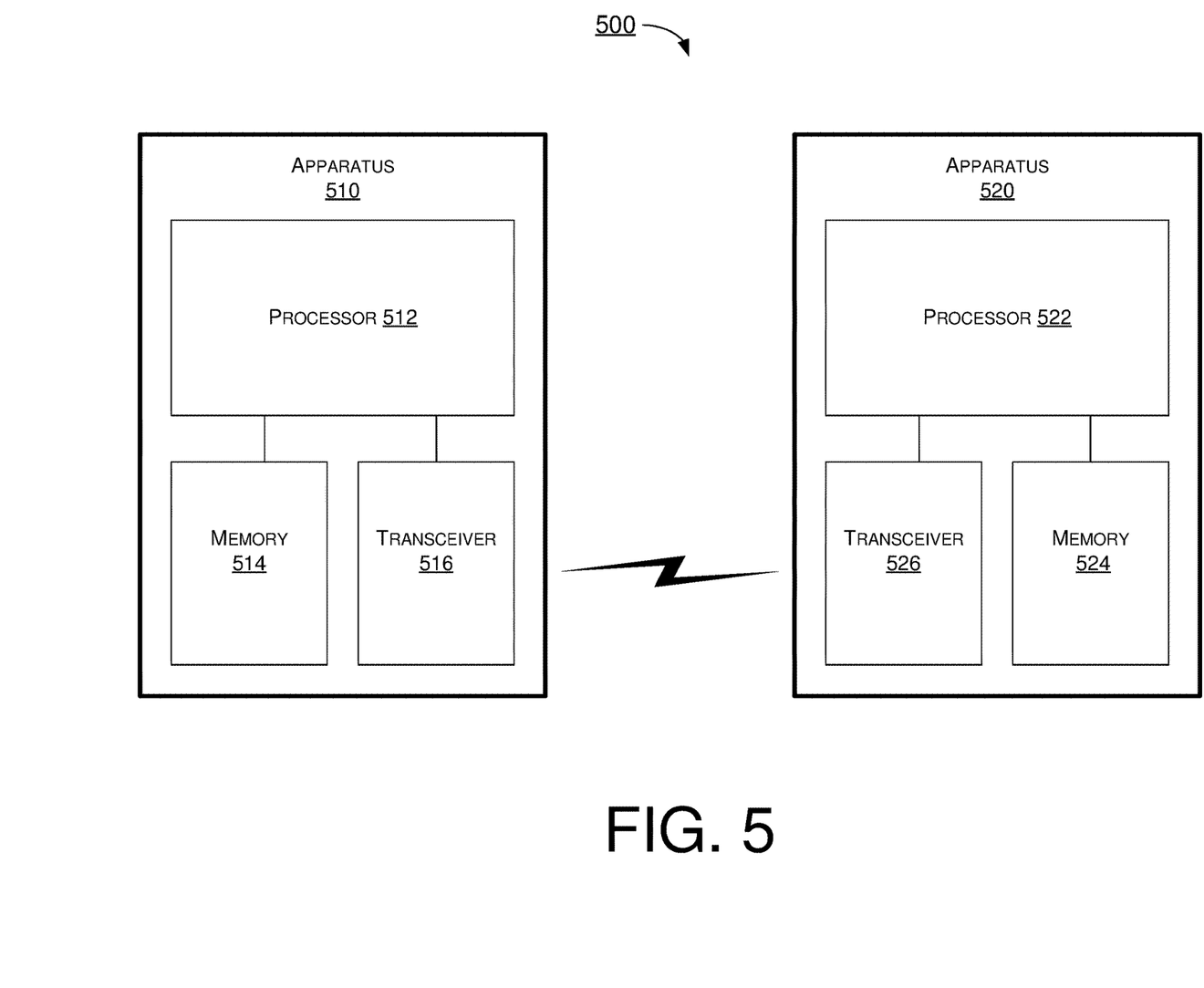
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to wide-bandwidth transmission in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP STA or an AP STA. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to wide-bandwidth transmission in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110 (e.g., an AP STA), and apparatus 520, as STA 120 (e.g., a non-AP STA), is provided below. It is noteworthy that, although the example implementations described below are provided in the context of WLAN, the same may be implemented in other types of networks. It is also noteworthy that, although examples described below are provide in the context of apparatus 510, the examples may also be applicable to apparatus 520 or otherwise implemented by apparatus 520.

Under a proposed scheme pertaining to wide-bandwidth transmission in wireless communications in accordance with the present disclosure, with apparatus 510 implemented in or as STA 110 and apparatus 520 implemented in or as STA 120 in network environment 100 in accordance with one or more of IEEE 802.11 standards, processor 512 of apparatus 510 may detect, via transceiver 516, a non-primary subband of an operating bandwidth comprising a primary subband (e.g., one or more primary subbands) and the non-primary subband to be idle. Additionally, processor 512 may perform a transmission on at least the non-primary subband (e.g., to apparatus 520). For instance, processor 512 may control a transmit power of transceiver 516 in performing the transmission.

In some implementations, in performing the transmission on at least the non-primary subband, processor 512 may perform certain operations. For instance, processor 512 may independently determine a first transmit power for transmission on the primary subband and a second transmit power for transmission on the non-primary subband based on a respective allowed transmit power over each of the primary subband and the non-primary subband. Additionally, processor 512 may perform a respective transmission on each of the primary subband and the non-primary subband using the first transmit power and the second transmit power, respectively. In such cases, the first transmit power and the second transmit power may be different or equal, depending on respective channel conditions.

Alternatively, in performing the transmission on at least the non-primary subband, processor 512 may perform certain operations. For instance, processor 512 may jointly determine a first transmit power for transmission on the primary subband and a second transmit power for transmission on the non-primary subband based on a minimum allowed transmit power over the primary subband and the non-primary subband. Moreover, processor 512 may perform a respective transmission on each of the primary subband and the non-primary subband using the first transmit power and the second transmit power, respectively. In such cases, the first transmit power and the second transmit power may be the same or equal.

In some implementations, in performing the transmission on at least the non-primary subband, processor 512 may perform certain operations. For instance, processor 512 may perform physical channel sensing on the non-primary subband or a non-primary channel in the non-primary subband. Additionally, processor 512 may adjust the transmit power in transmission on the non-primary subband or the non-primary channel based on a result of the physical channel sensing.

In some implementations, in performing the physical channel sensing on the non-primary subband or the non-primary channel processor 512 may perform EDCA backoff on the non-primary channel based on the physical channel sensing with either or both of PD and ED. In such cases, in adjusting the transmit power in transmission on the non-primary subband or the non-primary channel, processor 512 may perform either of the following: (a) reducing a transmit power on the non-primary subband or the non-primary channel by a predetermined amount to result in a reduced transmit power in transmission on the non-primary subband or the non-primary channel in an event that the non-primary channel is determined idle using a first threshold; or (b) setting the transmit power on the non-primary subband or the non-primary channel as a reference transmit power used in transmission on the non-primary subband or the non-primary channel in an event that the non-primary channel is determined idle using a second threshold. Here, the second threshold may be lower than the first threshold. In some implementations, each of the first threshold and the second threshold may be a PD threshold or an ED threshold. For instance, when a valid preamble is detected, processor 512 may use a first PD threshold and a second threshold in performing the above-described operations to determine whether a medium is idle or not. Otherwise, in case no valid preamble is detected, processor 512 may use a first ED threshold and a second ED threshold to determine whether the medium is idle or not.

In some implementations, in performing the physical channel sensing on the non-primary subband or the non-primary channel, processor 512 may perform EDCA backoff on the non-primary channel based on the physical channel sensing with PD. In such cases, in adjusting the transmit power in transmission on the non-primary subband or the non-primary channel, processor 512 may perform one of the following: (a) setting a transmit power on the non-primary subband or the non-primary channel as a reference transmit power used in transmission on the non-primary subband or the non-primary channel in an event that a PD threshold used in the physical channel sensing is a minimum threshold; (b) reducing the reference transmit power by an amount equal to a difference between a maximum threshold and the minimum threshold to result in a first reduced transmit power in transmission on the non-primary subband or the non-primary channel in an event that the PD threshold used in the physical channel sensing is the maximum threshold; or (c) reducing the reference transmit power by an amount equal to a difference between the PD threshold and the minimum threshold to result in a second reduced transmit power in transmission on the non-primary subband or the non-primary channel in an event that the PD threshold used in the physical channel sensing is between the minimum threshold and the maximum threshold.

In some implementations, in performing the physical channel sensing on the non-primary subband or the non-primary channel, processor 512 may perform energy detection during a PIFS before a start of transmission on the non-primary channel. In such cases, in adjusting the transmit power in transmission on the non-primary subband or the non-primary channel, processor 512 may perform either of the following: (a) reducing a transmit power on the non-primary subband or the non-primary channel by a predetermined amount to result in a reduced transmit power in transmission on the non-primary subband or the non-primary channel in an event that the non-primary channel is determined idle using a first ED threshold; or (b) setting the transmit power on the non-primary subband or the non-primary channel as a reference transmit power used in transmission on the non-primary subband or the non-primary channel in an event that the non-primary channel is determined idle using a second ED threshold. Here, the first ED threshold may be a default threshold and the second ED threshold may be lower than the first ED threshold.

In some implementations, in performing the physical channel sensing on the non-primary subband or the non-primary channel, processor 512 may perform energy detection during a PIFS before a start of transmission on the non-primary channel. In such cases, in adjusting the transmit power in transmission on the non-primary subband or the non-primary channel, processor 512 may perform one of the following: (a) setting a transmit power on the non-primary subband or the non-primary channel as a reference transmit power used in transmission on the non-primary subband or the non-primary channel in an event that an ED threshold is a minimum threshold; (b) reducing the reference transmit power by an amount equal to a difference between a maximum threshold and the minimum threshold to result in a first reduced transmit power in transmission on the non-primary subband or the non-primary channel in an event that the ED threshold is the maximum threshold; or (c) reducing the reference transmit power by an amount equal to a difference between the ED threshold and the minimum threshold to result in a second reduced transmit power in transmission on the non-primary subband or the non-primary channel in an event that the ED threshold is between the minimum threshold and the maximum threshold.

In some implementations, in detecting the non-primary subband to be idle, processor 512 may perform certain operations. For instance, processor 512 may detect the primary subband to be idle by performing EDCA on the primary subband with a static PD threshold set at a minimum threshold. Additionally, processor 512 may detect the non-primary subband to be idle by performing PIFS ED on the non-primary channel. In such cases, in performing the transmission on at least the non-primary subband, processor 512 may perform certain operations. For instance, processor 512 may either transmit, via transceiver 516, on the primary subband without power adjustment or jointly determine a first amount of power adjustment and a second amount of power adjustment for the primary subband and the non-primary subband, respectively. Moreover, processor 512 may transmit, via transceiver 516, on the non-primary subband with a transmit power by adjusting the transmit power based on a result of physical channel sensing on the non-primary subband.

In some implementations, in detecting the non-primary subband to be idle, processor 512 may perform certain operations. For instance, processor 512 may detect the primary subband to be idle by performing EDCA on the primary subband with a dynamic PD threshold set between a minimum threshold and a maximum threshold. Additionally, processor 512 may detect the non-primary subband to be idle by performing PIFS ED on the non-primary channel. In such cases, in performing the transmission on at least the non-primary subband, processor 512 may perform certain operations. For instance, processor 512 may jointly or independently determine a first amount of power adjustment and a second amount of power adjustment for the primary subband and the non-primary subband, respectively. Moreover, processor 512 may transmit, via transceiver 516, on the primary subband with a first reduced transmit power by adjusting a first transmit power on the primary subband by the first amount of power adjustment. Furthermore, processor 512 may transmit, via transceiver 516, on the non-primary subband with a second reduced transmit power by adjusting a second transmit power on the non-primary subband by the second amount of power adjustment.

In some implementations, in detecting the non-primary subband to be idle, processor 512 may perform certain operations. For instance, processor 512 may detect the primary subband to be busy (e.g., by performing PD on the primary subband with a PD threshold between a minimum threshold and a maximum threshold). Additionally processor 512 may detect the non-primary subband to be idle by performing EDCA backoff on the non-primary channel using a static or dynamic PD threshold or a static or dynamic ED threshold. In such cases, in performing the transmission on at least the non-primary subband, processor 512 may perform certain operations. For instance, processor 512 may refrain from transmission on the primary subband. Moreover, processor 512 may transmit, via transceiver 516, on the non-primary subband with a transmit power by adjusting the transmit power based on a result of physical channel sensing on the non-primary subband.

In some implementations, processor 512 may perform additional operations including: (i) detecting one or more signals on the non-primary subband each having a respective energy level higher than a PD threshold or an ED threshold during a window of time; (ii) recording the respective energy level of each of the one or more detected signals for the window of time; and (iii) determining a signal energy level for the window of time.

In some implementations, in determining the signal energy level for the window of time, processor 512 may set a maximum energy level among one or more energy levels of the one or more signals detected during the window of time as the signal energy level for the window of time.

Alternatively, in determining the signal energy level for the window of time, processor 512 may perform certain operations. For instance, processor 512 may compute a mathematic average energy level of one or more energy levels of the one or more signals detected during the window of time. Additionally, processor 512 may set the mathematic average energy level as the signal energy level for the window of time.

Still alternatively, in determining the signal energy level for the window of time, processor 512 may perform certain operations. For instance, processor 512 may compute a proportional fair average energy level of one or more energy levels of the one or more signals detected during the window of time based on: $ED_{avg-new} = a\ ED_{avg-cur} + (1-\alpha)*ED$. Moreover, processor 512 may set the proportional fair average energy level as the signal energy level for the window of time. In such cases, $ED_{avg-new}$ may denote a new average ED level, $ED_{avg-cur}$ may denote a current average ED level, ED may denote a current measurement value, and a may denote a proportional fairness coefficient.

Illustrative Processes

Figure 6:
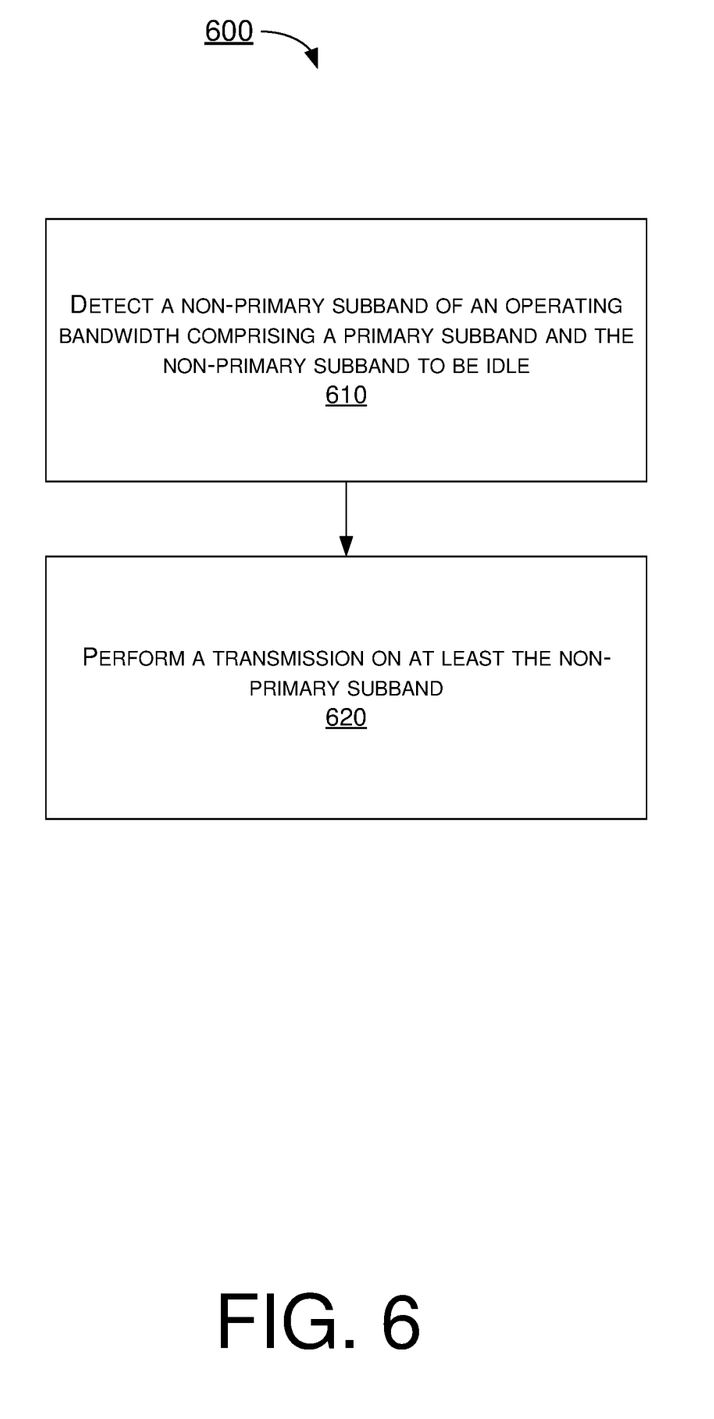
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to wide-bandwidth transmission in wireless communications in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 (e.g., AP STA) and apparatus 520 implemented in or as STA 120 (e.g., non-AP STA) of a wireless network such as a WLAN in network environment 100 in accordance with one or more of IEEE 802.11 standards. It is noteworthy that, although examples described below are provide in the context of apparatus 510, the examples may also be applicable to apparatus 520 or otherwise implemented by apparatus 520. Process 600 may begin at block 610.

At 610, process 600 may involve processor 512 of apparatus 510 detecting, via transceiver 516, a non-primary subband of an operating bandwidth comprising a primary subband and the non-primary subband to be idle. Process 600 may proceed from 610 to 620.

At 620, process 600 may involve processor 512 performing a transmission on at least the non-primary subband (e.g., to apparatus 520). For instance, process 600 may involve processor 512 controlling a transmit power in performing the transmission.

In some implementations, in performing the transmission on at least the non-primary subband, process 600 may involve processor 512 performing certain operations. For instance, process 600 may involve processor 512 independently determining a first transmit power for transmission on the primary subband and a second transmit power for transmission on the non-primary subband based on a respective allowed transmit power over each of the primary subband and the non-primary subband. Additionally, process 600 may involve processor 512 performing a respective transmission on each of the primary subband and the non-primary subband using the first transmit power and the second transmit power, respectively. In such cases, the first transmit power and the second transmit power may be different or equal, depending on respective channel conditions.

Alternatively, in performing the transmission on at least the non-primary subband, process 600 may involve processor 512 performing certain operations. For instance, process 600 may involve processor 512 jointly determining a first transmit power for transmission on the primary subband and a second transmit power for transmission on the non-primary subband based on a minimum allowed transmit power over the primary subband and the non-primary subband. Moreover, process 600 may involve processor 512 performing a respective transmission on each of the primary subband and the non-primary subband using the first transmit power and the second transmit power, respectively. In such cases, the first transmit power and the second transmit power may be the same or equal.

In some implementations, in performing the transmission on at least the non-primary subband, process 600 may involve processor 512 performing certain operations. For instance, process 600 may involve processor 512 performing physical channel sensing on the non-primary subband or a non-primary channel in the non-primary subband. Additionally, process 600 may involve processor 512 adjusting the transmit power in transmission on the non-primary subband or the non-primary channel based on a result of the physical channel sensing.

In some implementations, in performing the physical channel sensing on the non-primary subband or the non-primary channel, process 600 may involve processor 512 performing EDCA backoff on the non-primary channel based on the physical channel sensing with either or both of PD and ED. In such cases, in adjusting the transmit power in transmission on the non-primary subband or the non-primary channel, process 600 may involve processor 512 performing either of the following: (a) reducing a transmit power on the non-primary subband or the non-primary channel by a predetermined amount to result in a reduced transmit power in transmission on the non-primary subband or the non-primary channel in an event that the non-primary channel is determined idle using a first threshold; or (b) setting the transmit power on the non-primary subband or the non-primary channel as a reference transmit power used in transmission on the non-primary subband or the non-primary channel in an event that the non-primary channel is determined idle using a second threshold. Here, the second threshold may be lower than the first threshold. In some implementations, each of the first threshold and the second threshold may be a PD threshold or an ED threshold. For instance, when a valid preamble is detected, process 600 may involve processor 512 using a first PD threshold and a second threshold in performing the above-described operations to determine whether a medium is idle or not. Otherwise, in case no valid preamble is detected, process 600 may involve processor 512 using a first ED threshold and a second ED threshold to determine whether the medium is idle or not.

In some implementations, in performing the physical channel sensing on the non-primary subband or the non-primary channel, process 600 may involve processor 512 performing EDCA backoff on the non-primary channel based on the physical channel sensing with PD. In such cases, in adjusting the transmit power in transmission on the non-primary subband or the non-primary channel, process 600 may involve processor 512 performing one of the following: (a) setting a transmit power on the non-primary subband or the non-primary channel as a reference transmit power used in transmission on the non-primary subband or the non-primary channel in an event that a PD threshold used in the physical channel sensing is a minimum threshold; (b) reducing the reference transmit power by an amount equal to a difference between a maximum threshold and the minimum threshold to result in a first reduced transmit power in transmission on the non-primary subband or the non-primary channel in an event that the PD threshold used in the physical channel sensing is the maximum threshold; or (c) reducing the reference transmit power by an amount equal to a difference between the PD threshold and the minimum threshold to result in a second reduced transmit power in transmission on the non-primary subband or the non-primary channel in an event that the PD threshold used in the physical channel sensing is between the minimum threshold and the maximum threshold.

In some implementations, in performing the physical channel sensing on the non-primary subband or the non-primary channel, process 600 may involve processor 512 performing energy detection during a PIFS before a start of transmission on the non-primary channel. In such cases, in adjusting the transmit power in transmission on the non-primary subband or the non-primary channel, process 600 may involve processor 512 performing either of the following: (a) reducing a transmit power on the non-primary subband or the non-primary channel by a predetermined amount to result in a reduced transmit power in transmission on the non-primary subband or the non-primary channel in an event that the non-primary channel is determined idle using a first ED threshold; or (b) setting the transmit power on the non-primary subband or the non-primary channel as a reference transmit power used in transmission on the non-primary subband or the non-primary channel in an event that the non-primary channel is determined idle using a second ED threshold. Here, the first ED threshold may be a default threshold and the second ED threshold may be lower than the first ED threshold.

In some implementations, in performing the physical channel sensing on the non-primary subband or the non-primary channel, process 600 may involve processor 512 performing energy detection during a PIFS before a start of transmission on the non-primary channel. In such cases, in adjusting the transmit power in transmission on the non-primary subband or the non-primary channel, process 600 may involve processor 512 performing one of the following: (a) setting a transmit power on the non-primary subband or the non-primary channel as a reference transmit power used in transmission on the non-primary subband or the non-primary channel in an event that an ED threshold is a minimum threshold; (b) reducing the reference transmit power by an amount equal to a difference between a maximum threshold and the minimum threshold to result in a first reduced transmit power in transmission on the non-primary subband or the non-primary channel in an event that the ED threshold is the maximum threshold; or (c) reducing the reference transmit power by an amount equal to a difference between the ED threshold and the minimum threshold to result in a second reduced transmit power in transmission on the non-primary subband or the non-primary channel in an event that the ED threshold is between the minimum threshold and the maximum threshold.

In some implementations, in detecting the non-primary subband to be idle, process 600 may involve processor 512 performing certain operations. For instance, process 600 may involve processor 512 detecting the primary subband to be idle by performing EDCA on the primary subband with a static PD threshold set at a minimum threshold. Additionally, process 600 may involve processor 512 detecting the non-primary subband to be idle by performing PIFS ED on the non-primary channel. In such cases, in performing the transmission on at least the non-primary subband, process 600 may involve processor 512 performing certain operations. For instance, process 600 may involve processor 512 either transmitting, via transceiver 516, on the primary subband without power adjustment or jointly determining a first amount of power adjustment and a second amount of power adjustment for the primary subband and the non-primary subband, respectively. Moreover, process 600 may involve processor 512 transmitting, via transceiver 516, on the non-primary subband with a transmit power by adjusting the transmit power based on a result of physical channel sensing on the non-primary subband.

In some implementations, in detecting the non-primary subband to be idle, process 600 may involve processor 512 performing certain operations. For instance, process 600 may involve processor 512 detecting the primary subband to be idle by performing EDCA on the primary subband with a dynamic PD threshold set between a minimum threshold and a maximum threshold. Additionally, process 600 may involve processor 512 detecting the non-primary subband to be idle by performing PIFS ED on the non-primary channel. In such cases, in performing the transmission on at least the non-primary subband, process 600 may involve processor 512 performing certain operations. For instance, process 600 may involve processor 512 jointly or independently determining a first amount of power adjustment and a second amount of power adjustment for the primary subband and the non-primary subband, respectively. Moreover, process 600 may involve processor 512 transmitting, via transceiver 516, on the primary subband with a first reduced transmit power by adjusting a first transmit power on the primary subband by the first amount of power adjustment. Furthermore, process 600 may involve processor 512 transmitting, via transceiver 516, on the non-primary subband with a second reduced transmit power by adjusting a second transmit power on the non-primary subband by the second amount of power adjustment.

In some implementations, in detecting the non-primary subband to be idle, process 600 may involve processor 512 performing certain operations. For instance, process 600 may involve processor 512 detecting the primary subband to be busy (e.g., by performing PD on the primary subband with a PD threshold between a minimum threshold and a maximum threshold). Additionally, process 600 may involve processor 512 detecting the non-primary subband to be idle by performing EDCA backoff on the non-primary channel using a static or dynamic PD threshold or a static or dynamic ED threshold. In such cases, in performing the transmission on at least the non-primary subband, process 600 may involve processor 512 performing certain operations. For instance, process 600 may involve processor 512 refraining from transmission on the primary subband. Moreover, process 600 may involve processor 512 transmitting, via transceiver 516, on the non-primary subband with a transmit power by adjusting the transmit power based on a result of physical channel sensing on the non-primary subband.

In some implementations, process 600 may involve processor 512 performing additional operations. For instance, process 600 may involve processor 512 performing the following: (i) detecting one or more signals on the non-primary subband each having a respective energy level higher than a PD threshold or an ED threshold during a window of time; (ii) recording the respective energy level of each of the one or more detected signals for the window of time; and (iii) determining a signal energy level for the window of time.

In some implementations, in determining the signal energy level for the window of time, process 600 may involve processor 512 setting a maximum energy level among one or more energy levels of the one or more signals detected during the window of time as the signal energy level for the window of time.

Alternatively, in determining the signal energy level for the window of time, process 600 may involve processor 512 performing certain operations. For instance, process 600 may involve processor 512 computing a mathematic average energy level of one or more energy levels of the one or more signals detected during the window of time. Additionally, process 600 may involve processor 512 setting the mathematic average energy level as the signal energy level for the window of time.

Still alternatively, in determining the signal energy level for the window of time, process 600 may involve processor 512 performing certain operations. For instance, process 600 may involve processor 512 computing a proportional fair average energy level of one or more energy levels of the one or more signals detected during the window of time based on: $ED_{avg\text{-}new}=\alpha*ED_{avg\text{-}cur}+(1-\alpha)*ED$. Moreover, process 600 may involve processor 512 setting the proportional fair average energy level as the signal energy level for the window of time. In such cases, $ED_{avg\text{-}new}$ may denote a new average ED level, $ED_{avg\text{-}cur}$ may denote a current average ED level, ED may denote a current measurement value, and a may denote a proportional fairness coefficient.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   detecting a non-primary subband of an operating bandwidth comprising a primary subband and the non-primary subband to be idle; and
   performing a transmission on at least the non-primary subband,
   wherein performing of the transmission on at least the non-primary subband comprises:
      determining a first transmit power for transmission on the primary subband and a second transmit power for transmission on the non-primary subband based on a respective allowed transmit power over each of the primary subband and the non-primary subband;

performing a respective transmission on each of the primary subband and the non-primary subband using the first transmit power and the second transmit power, respectively; and adjusting the transmit power in transmission on the non-primary subband or the non-primary channel based on a result of the physical channel sensing, wherein the adjusting of the transmit power in transmission on the non-primary subband or the non-primary channel comprises:

reducing a transmit power on the non-primary subband or the non-primary channel by a predetermined amount to result in a reduced transmit power in transmission on the non-primary subband or the non-primary channel in an event that the non-primary channel is determined idle using a first threshold; and setting the transmit power on the non-primary subband or the non-primary channel as a reference transmit power used in transmission on the non-primary subband or the non-primary channel in an event that the non-primary channel is determined idle using a second threshold, and wherein the second threshold is lower than the first threshold.

2. The method of claim 1, wherein performing of the transmission on at least the non-primary subband further comprises performing physical channel sensing on the non-primary subband or a non-primary channel in the non-primary subband.

3. The method of claim 2, wherein the performing of the physical channel sensing on the non-primary subband or the non-primary channel comprises performing enhanced distributed channel access (EDCA) backoff on the non-primary channel based on the physical channel sensing with either or both of preamble detection (PD) and energy detection (ED).

4. The method of claim 2, wherein the performing of the physical channel sensing on the non-primary subband or the non-primary channel comprises performing enhanced distributed channel access (EDCA) backoff on the non-primary channel based on the physical channel sensing with preamble detection (PD), and wherein the adjusting of the transmit power in transmission on the non-primary subband or the non-primary channel comprises performing one of:

setting a transmit power on the non-primary subband or the non-primary channel as a reference transmit power used in transmission on the non-primary subband or the non-primary channel in an event that a PD threshold used in the physical channel sensing is a minimum threshold;

reducing the reference transmit power by an amount equal to a difference between a maximum threshold and the minimum threshold to result in a first reduced transmit power in transmission on the non-primary subband or the non-primary channel in an event that the PD threshold used in the physical channel sensing is the maximum threshold; or reducing the reference transmit power by an amount equal to a difference between the PD threshold and the minimum threshold to result in a second reduced transmit power in transmission on the non-primary subband or the non-primary channel in an event that the PD threshold used in the physical channel sensing is between the minimum threshold and the maximum threshold.

5. The method of claim 2, wherein the performing of the physical channel sensing on the non-primary subband or the non-primary channel comprises performing energy detection (ED) during a point coordination function (PCF) interframe space (PIFS) before a start of transmission on the non-primary channel, and wherein the adjusting of the transmit power in transmission on the non-primary subband or the non-primary channel comprises performing either:

reducing a transmit power on the non-primary subband or the non-primary channel by a predetermined amount to result in a reduced transmit power in transmission on the non-primary subband or the non-primary channel in an event that the non-primary channel is determined idle using a first ED threshold; or setting the transmit power on the non-primary subband or the non-primary channel as a reference transmit power used in transmission on the non-primary subband or the non-primary channel in an event that the non-primary channel is determined idle using a second ED threshold, wherein the first ED threshold is a default threshold and the second ED threshold is lower than the first ED threshold.

6. The method of claim 2, wherein the performing of the physical channel sensing on the non-primary subband or the non-primary channel comprises performing energy detection (ED) during a point coordination function (PCF) interframe space (PIFS) before a start of transmission on the non-primary channel, and wherein the adjusting of the transmit power in transmission on the non-primary subband or the non-primary channel comprises performing one of:

setting a transmit power on the non-primary subband or the non-primary channel as a reference transmit power used in transmission on the non-primary subband or the non-primary channel in an event that an ED threshold is a minimum threshold;

reducing the reference transmit power by an amount equal to a difference between a maximum threshold and the minimum threshold to result in a first reduced transmit power in transmission on the non-primary subband or the non-primary channel in an event that the ED threshold is the maximum threshold; or reducing the reference transmit power by an amount equal to a difference between the ED threshold and the minimum threshold to result in a second reduced transmit power in transmission on the non-primary subband or the non-primary channel in an event that the ED threshold is between the minimum threshold and the maximum threshold.

7. The method of claim 1, wherein:

the detecting the non-primary subband to be idle comprises:

detecting the primary subband to be idle by performing enhanced distributed channel access (EDCA) on the primary subband with a static preamble detection (PD) threshold set at a minimum threshold; and detecting the non-primary subband to be idle by performing point coordination function (PCF) interframe space (PIFS) energy detection (ED) on the non-primary channel, and the performing of the transmission on at least the non-primary subband comprises:

transmitting on the non-primary subband with a transmit power by adjusting the transmit power based on a result of physical channel sensing on the non-primary subband.

8. The method of claim 1, wherein:
the detecting the non-primary subband to be idle comprises:
   detecting the primary subband to be idle by performing enhanced distributed channel access (EDCA) on the primary subband with a dynamic preamble detection (PD) threshold set between a minimum threshold and a maximum threshold; and
   detecting the non-primary subband to be idle by performing point coordination function (PCF) interframe space (PIFS) energy detection (ED) on the non-primary channel.

9. The method of claim 1, wherein:
the detecting the non-primary subband to be idle comprises:
   detecting the primary subband to be busy; and
   detecting the non-primary subband to be idle by performing enhanced distributed channel access (EDCA) backoff on the non-primary channel using a static or dynamic preamble detection (PD) threshold or a static or dynamic energy detection (ED) threshold, and
the performing of the transmission on at least the non-primary subband comprises:
   refraining from transmission on the primary subband; and
   transmitting on the non-primary subband with a transmit power by adjusting the transmit power based on a result of physical channel sensing on the non-primary subband.

10. The method of claim 1, further comprising:
detecting one or more signals on the non-primary subband each having a respective energy level higher than a preamble detection (PD) threshold or an energy detection (ED) threshold during a window of time;
recording the respective energy level of each of the one or more detected signals for the window of time; and
determining a signal energy level for the window of time.

11. An apparatus, comprising:
a transceiver configured to communicate wirelessly over an operating bandwidth comprising a primary subband and a non-primary subband; and
a processor coupled to the transceiver and configured to perform operations comprising:
   detecting, via the transceiver, the non-primary subband to be idle; and
   performing a transmission, via the transceiver, on at least the non-primary subband,
   wherein, in performing the transmission on at least the non-primary subband, the processor is configured to perform operations comprising:
      determining a first transmit power for transmission on the primary subband and a second transmit power for transmission on the non-primary subband based on a respective allowed transmit power over each of the primary subband and the non-primary subband;
      performing, via the transceiver, a respective transmission on each of the primary subband and the non-primary subband using the first transmit power and the second transmit power, respectively; and
      adjusting the transmit power in transmission on the non-primary subband or the non-primary channel based on a result of the physical channel sensing,
   wherein the adjusting of the transmit power in transmission on the non-primary subband or the non-primary channel comprises:
      reducing a transmit power on the non-primary subband or the non-primary channel by a predetermined amount to result in a reduced transmit power in transmission on the non-primary subband or the non-primary channel in an event that the non-primary channel is determined idle using a first threshold; and
      setting the transmit power on the non-primary subband or the non-primary channel as a reference transmit power used in transmission on the non-primary subband or the non-primary channel in an event that the non-primary channel is determined idle using a second threshold, and
   wherein the second threshold is lower than the first threshold.

12. The apparatus of claim 11, wherein, in performing the transmission on at least the non-primary subband, the processor is further configured to perform operations comprising:
performing, via the transceiver, physical channel sensing on the non-primary subband or a non-primary channel in the non-primary subband.

13. The apparatus of claim 11, wherein the processor is further configured to perform operations comprising:
detecting one or more signals on the non-primary subband each having a respective energy level higher than a preamble detection (PD) threshold or an energy detection (ED) threshold during a window of time;
recording the respective energy level of each of the one or more detected signals for the window of time; and
determining a signal energy level for the window of time.

* * * * *